United States Patent [19]

Sugaya et al.

[11] Patent Number: 5,400,308
[45] Date of Patent: Mar. 21, 1995

[54] OPTICAL INFORMATION RECORDING/REPRODUCING DEVICE CAPABLE OF RECORDING INFORMATION ON A MOVING MEDIUM AND REPRODUCING INFORMATION BY USING REPRODUCING LIGHT BEAMS

[75] Inventors: Takumi Sugaya, Hachioji; Takao Rokutan, Higashimurayama; Mitsuo Oshiba, Hachioji; Takefumi Sakurada, Akishima; Naoaki Tani, Hachioji, all of Japan

[73] Assignee: Olympus Optical Co., Ltd., Tokyo, Japan

[21] Appl. No.: 107,171

[22] Filed: Aug. 17, 1993

[30] Foreign Application Priority Data

Aug. 19, 1992 [JP] Japan ................... 4-220475

[51] Int. Cl.⁶ .................... G11B 13/00; G11B 7/00
[52] U.S. Cl. .................... 369/15; 369/44.37; 369/44.38
[58] Field of Search .............. 369/15, 44.11, 47, 112, 369/44.38, 44.37, 44.41, 44.42, 32

[56] References Cited

U.S. PATENT DOCUMENTS

| | | | |
|---|---|---|---|
| 4,730,293 | 3/1988 | Pierce et al. | 369/44.26 |
| 5,027,339 | 6/1991 | Yoda et al. | 369/54 |
| 5,153,863 | 10/1992 | Noda et al. | 369/44.37 |
| 5,184,340 | 2/1993 | Kachi et al. | 369/44.38 |
| 5,247,504 | 9/1993 | Akatsuka | 369/44.38 |
| 5,267,226 | 11/1993 | Matsuoka et al. | 369/44.29 |
| 5,293,365 | 3/1994 | Rokutan | 369/44.29 |
| 5,293,366 | 3/1994 | Ohta | 369/44.33 |

FOREIGN PATENT DOCUMENTS

| | | | |
|---|---|---|---|
| 62-1135 | 1/1987 | Japan | 369/15 |
| 62-298033 | 12/1987 | Japan | 369/44.38 |
| 63-94438 | 4/1988 | Japan | 369/44.38 |
| 2-61830 | 3/1990 | Japan | |

*Primary Examiner*—Robert J. Pascal
*Assistant Examiner*—Tan Dinh
*Attorney, Agent, or Firm*—Armstrong, Westerman, Hattori, McLeland & Naughton

[57] ABSTRACT

According to the optical information recording/reproducing device of the present invention, upon recording of information, when a pit image on an optical detector which is formed by a recording optical beam spot at an information recording time arrives at a position of a O-order diffraction light spot image, while an optical card is moving in the forward direction, a light receiving element for signal reproducing senses a change in light amount. A verify signal is obtained immediately after recording based on the light amount change to perform a verify operation. Further, when a pit image on the optical detector formed by the recording optical spot arrives at a position of the image of the primary diffraction optical spot while a moving direction of the optical card is reversed and the optical card moves in the reverse direction to perform recording, a signal reproducing light receiving element senses a change in light amount. A verify signal is obtained immediately after recording based on the light amount change to perform a verify operation. Since irradiation is made in which the space between the recording optical spot and the O-order diffraction light spot is made equal to the space between the recording optical spot and the primary diffraction light spot b, an optical detector can receive the verify signal at the same timing even if the optical card moves in the forward or reverse direction.

11 Claims, 8 Drawing Sheets

OPTICAL MEMORY CARD MOVING DIRECTION

OPTICAL MEMORY CARD MOVING DIRECTION

OPTICAL MEMORY CARD MOVING DIRECTION

OPTICAL INFORMATION RECORDING/REPRODUCING DEVICE CAPABLE OF RECORDING INFORMATION ON A MOVING MEDIUM AND REPRODUCING INFORMATION BY USING REPRODUCING LIGHT BEAMS

BACKGROUND OF THE INVENTION

1. Field of the Invention

The present invention relates to an optical information recording/reproducing device which optically records and reproduces information on an optical recording medium such as an optical card, and an optical head used in the optical information recording/reproducing device, and more particularly to an optical information recording/reproducing device including a first light source for producing an information recording optical beam and a second light source for producing an information reproducing optical beam, and an optical head used in the optical information recording/reproducing device.

2. Related Art Statement

An optical recording medium such as an optical card or the like includes a plurality of tracks extending in parallel to each other. Meanwhile an optical information recording/reproducing device for the optical card has an optical head for optically recording/reproducing information to/from the optical card. In order to perform an information recording/reproducing, the optical recording medium and the optical card reciprocate in the track direction of the optical recording medium and in a direction extending perpendicularly thereto.

Such an optical information recording/reproducing device is disclosed, for example, in Japanese Laid-open Patent No. HEI 2-61830. The optical information recording/reproducing device provided with a plurality of light sources is provided, independently from each other, with the plurality of light sources, an optical beam producing light source for generating information recording optical beam and a light source for generating information reproducing light beam so that so-called verify operation can be performed simultaneously with scanning for recording, which causes an information reproducing optical beam to record the information onto an optical recording medium, and the quality of the recording by reproduction of the information by the information reproducing optical beam.

In the optical information recording/reproducing device, the effective recording speed is substantially doubled as compared with an arrangement in which, in a single light-source type device, an optical beam spot is scanned twice on a track formed on an optical recording medium, upon performing verification.

Further, since a two-light source type device can maintain an amount of light emission from the information reproducing light source constant, a focus servo signal and a tracking servo signal can be obtained from an optical beam for information reproduction. Hence the two-light source type device has an advantage in that a stable servo control can be performed even during recording of the information.

FIG. 10 is a view showing an arrangement of an optical head built in the conventional two-light source type optical information recording/reproducing device. A recording optical beam generated by a semiconductor laser 101 is converted into a nearly oval, parallel beam by a collimator lens 102. Moreover, a shaping prism 103 reduces only the major axis component of the oval form of the parallel beam so as to be shaped into a nearly round beam. Subsequently, a round iris 104 further stops down the beam diameter, of the parallel beam such that the spot size on the recording medium is brought to predetermined dimension, and the parallel beam is incident upon a polarizing beam splitter 105. Since the recording round beam is formed of nearly a S-polarized component because of the property of the semiconductor laser 101, most of the beam is reflected from a reflecting surface of the polarizing beam splitter 105 and is incident upon the optical axis of an objective lens 106. The light is condensed by the objective lens 106 to form a round spot on an optical card 107 and to enhance locally the energy density so that a thermal irreversible change is generated in the recording layer of the optical card 107 to form a recording pit.

Meanwhile, a single-surface light emitting diode 108 having a light emitting surface in the form of a slit, for example, is used as a light source of the reproducing optical beam. The optical beam for reproduction generated from the reproducing light emitting diode 108 is converted to a nearly parallel beam by the collimate lens 109 and is incident upon polarizing beam splitter 105. The polarizing beam splitter 105 penetrates only the P-polarizing component thereof. The component is incident upon a position shifted from the optical axis with respect to the objective lens 106 to form on the optical card 107 an image projected on the light emitting surface of the light emitting diode 108.

FIG. 11 is a view showing the positional relationship between an optical spot 123 of the recording optical beam from the semiconductor laser 101 formed on the optical card 107 and the reproducing optical beam spot 124 from the light emitting diode 108. A plurality of guide tracks 121 are formed in parallel with each other and extend longitudinally on the optical card 107. Information tracks 120 are formed between the guide tracks 121. The optical beam spots 123 and 124 are formed so as to move relatively in the direction indicated by the arrow a or b in parallel to the extending direction of the track with respect to the optical card 107. The semiconductor laser 101 receives pulses modulated by information to be recorded and emits light in accordance with the pulses. Pits 122 are formed sequentially on the optical card 107 to record information in a pit chain form on the information track 120, as shown in FIG. 11. The relative distance between the reproducing optical beam spot 124 and the recording optical beam spot 123 is adjusted by providing a relative angle difference between the optical axis of the reproducing optical beam and the optical axis of the recording optical beam before being incident upon the objective lens 106 upon assembling and adjustment of an optical head.

The information reproducing optical beam emitted from the light emitting diode 108 is brought to a condition in which a light amount modulation is applied to the optical beam, depending upon presence or absence of the guide tracks 121 and the pits 122 on the optical card 107 and is reflected regularly back from the optical card 107. The reflective beam passes reversely through the objective lens 106 and is converted to nearly parallel beam light so as to be introduced to the polarizing beam splitter 105 (see FIG. 10). The parallel light maintains substantially its P-polarization because it is reflected regularly back from the optical card 107 and most of the component passes through the polarizing beam splitter 105 and is introduced to the reflective mirror 114. The light reflected by a reflective mirror 114 is condensed by a condensing lens 115 and is further split by a half-mirror lens 116. The light is incident upon an optical detector 117 for signal reproduction and tracking and an optical detector 118 for focusing. As described above, the optical beam for reproduction is incident upon a position eccentric from the optical axis with respect to the objective lens 106 so that detection of a focus error is performed by a so-called out-of axis type. The arrangement is such that a twice-divided light receiving element, for example, is arranged at the focusing optical detector 118 to detect a shift or movement in an image of a reproducing light beam spot 114 due to a focus deviation.

FIG. 12 is a view showing a recording optical beam spot image 123a and the reproducing optical beam spot image 124 projected on the signal reproducing and tracking optical detector 117. Signal reproducing light receiving elements 132, and 133, and tracking light receiving elements 130 and 131 are arranged on the optical detector 117. In FIG. 11, the image 124a in which the reproducing optical beam spot is enlarged and projected is imaged at a proper position on the light receiving elements under a condition in which there are no track deviation and no focus deviation. The tracking light receiving elements 130 and 131 detect a positional variation in a track guide image caused by a track deviation as a change in light receiving amount to produce a tracking error signal. Moreover, upon reproduction of a signal, the signal reproducing light receiving elements 132 and 133 detect the presence or absence of pits in two tracks to output a reproducing signal.

Upon recording of information, when the optical card 107, as shown in FIG. 12, moves in the direction indicated by the arrow a, the pit 122 formed by the recording optical beam spot 123 moves in the direction of the optical image 124 of a reproducing optical beam. Accordingly, when the pit 122 reaches the position of the optical image 124, a change in light amount occurs in the signal reproducing light receiving element 133 on the optical detector 117. The signal reproducing light receiving element 113 detects the change in light amount to output a reproducing signal. That is, when the optical memory card 107 moves in the direction of the arrow a, a so-called verify operation can be performed in which a reproducing signal is obtained immediately after information has been recorded. On the other hand, when the optical card 107 moves in the direction of the arrow b, the recorded last pit line is detected and, subsequently, an additional recording operation can be performed.

In connection with the above, since spacing between a recording beam and a verify beam and the relative velocity between the recording beam and the card pickup (may be actually measured, or a control target value may be utilized) is previously known, the delay time from a recording beam irradiation to production of a verify signal and delay time from detection of the last pit line to start of the postscript operation can be operated or computed. In view thereof, regarding the start timing of the verify operation, and the start timing of the postscript or additional operation, only computing time decided by the above-described method is measured and is decided by a timer.

However, in such conventional two-light source type optical information recording/reproducing device, as will be clear from FIG. 12, the light image 124 of the reproducing optical beam is formed only at a single location with respect to the recording optical beam spot 123. Accordingly, in a case where an optical recording medium moves in a fixed direction or in the direction indicated by the arrow a in the aforesaid example, a verify operation can be performed immediately after recording. However, there is a disadvantage in that, in a case where the moving direction of the optical recording medium is reversed and moves in the direction indicated by the arrow b, a reproducing signal cannot immediately after recording be obtained.

Furthermore, there is a disadvantage in that, although when the optical card moves in the direction of the arrow b, a reproduction signal can be obtained in advance, when the optical card moves in the direction of the arrow a, the additional recording operation cannot be performed.

OBJECTS AND SUMMARY OF THE INVENTION

It is an object of the present invention to provide an optical information recording/reproducing device and an optical head for use in the optical information recording/reproducing device, in which, on an optical information recording medium, reproducing optical beam spots are respectively illuminated or irradiated to positions spaced apart from each other forwardly and rearwardly of the recording optical beam spot by equal spacing, whereby, in a case where a moving direction of the optical recording medium is reversed, it is possible to immediately check the quality of the recording by a simple circuit arrangement.

It is another object of the present invention to provide an optical information recording/reproducing device, and an optical head for use in the optical information recording/reproducing device, in which reproducing optical beam spots are respectively irradiated to the positions spaced away from each other by equal distance, or an optical information recording medium, whereby, even in a case where a moving direction of the optical recording medium is reversed, it is possible to detect an unrecorded area or region on the optical information recording medium by a simple circuit arrangement to immediately perform postscript recording.

According to the present invention, there is provided an optical information recording/reproducing device comprising an optical head including a recording light source for irradiating a recording optical beam onto at least one of a plurality of tracks of an optical recording medium, the optical recording medium having a plurality of information recordable tracks, at least one reproducing light source for irradiating a first reproducing optical beam onto a position in front of a track, in a track direction, irradiated by the recording light source and for irradiating a second reproducing optical beam onto a position in rear of the track in the track direction, irradiated by the recording light source with respect to the track illuminated at least by the recording light source, first light-receiving detecting means for receiving a returned light of the first reproducing optical beam from the optical recording medium and for outputting information of the track as a detection signal, and second light-receiving detecting means for receiving a returned light of the second reproducing optical beam from the optical recording medium and for outputting information of the track as a detection signal; scanning means for moving relatively with respect to the optical recording medium and the optical head to scan the track; and signal processing means for signal-processing the detection signal, wherein the reproducing light source irradiates the first reproducing optical beam and the second reproducing optical beam to a position in which the space in a track direction between an irradiating position of the recording optical beam and an irradiating position of the first reproducing optical beam is made equal to the space in a track direction between an irradiating position of the recording optical beam and an irradiating position of the second reproducing optical beam.

BRIEF DESCRIPTION OF THE DRAWINGS

FIG. 2 is a top plan view of an optical card showing, in enlargement, an information recording portion;

FIG. 3 is a structural view showing an arrangement of the optical system of the optical head shown in FIG. 1, for recording and reproducing information on and from an optical card of which the traveling direction varies relatively;

FIG. 4 is an explanatory view explaining a recording optical beam spot and a reproducing optical beam spot on an optical card;

FIG. 5 is an explanatory view explaining the layout of a light receiving element on an optical detector;

FIG. 6 is a block diagram showing the circuit configuration of the optical recording/reproducing device shown in FIG. 1;

FIG. 7 is a block diagram showing the structure of the data processing circuit shown in FIG. 6;

FIG. 8 is an explanatory view explaining timing of a verification start of the data processing circuit shown in FIG. 7;

FIG. 11 is an explanatory view describing a recording optical beam spot and a recording optical beam spot on an optical card; and FIG. 12 is an explanatory view explaining the layout of a light receiving element on an optical detector.

DETAILED DESCRIPTION OF THE PREFERRED EMBODIMENTS

Embodiments of the present invention will be explained below with reference to the accompanied drawings.

Figure 1A:
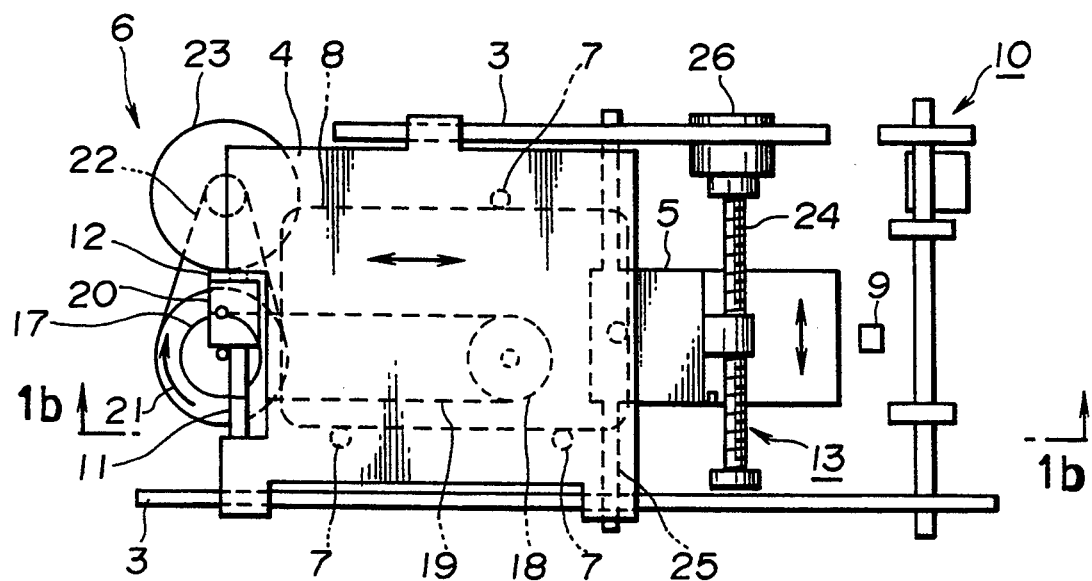
FIG. 1 to 8 relate to an embodiment of the invention, FIG. 1(a and b) being a top plan view showing the interior structure of an optical recording/reproducing device.
Figure 1B:
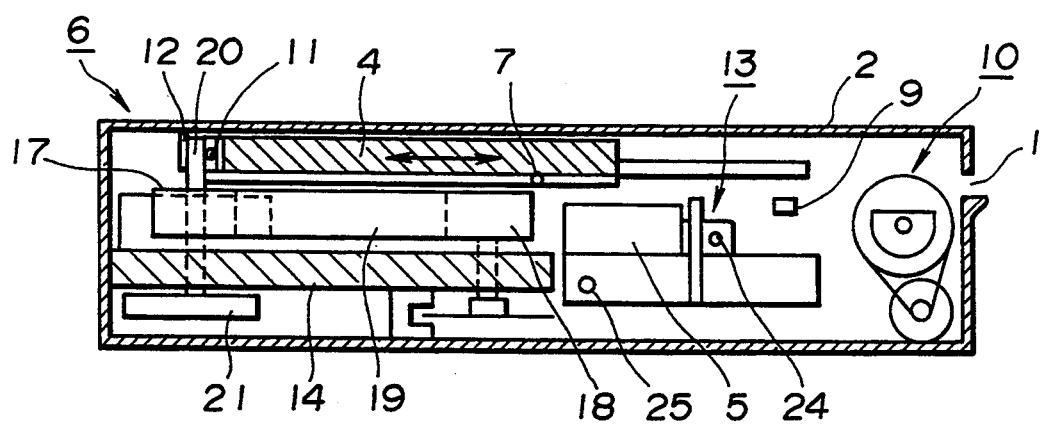

As shown in FIG. 1(a) and FIG. 1(b) which is a cross-sectional view taken along a line A—A in FIG. 1(a), in a card drive mechanism of an optical recording/reproducing device according to the present invention, a holder 4 which houses an optical card 8 inserted through the card inserting opening 1 is supported so as to move forth and back by a pair of guide shafts 3 arranged in parallel. An optical head 5 is arranged below the card insertion side (the right side in the figure) of the traveling route of the holder 4. Further, a card feed mechanism 6 is arranged on the interior side (the left side in the figure). A card holding unit 7 is formed on the lower surface of the holder 4 and has a height corresponding to that of the card insertion opening 1.

Moreover, a detector 9 is arranged at the card insertion side to detect the insertion of the optical card 8. A card load/eject mechanism 10 is arranged to operate based on a signal from the detector 9 and to move automatically an optical card 8 in and out of the card holding unit 7 of the holder 4.

A guide shaft 11 is perpendicular to the traveling direction of the holder 4 and arranged at the rear portion of the holder 4. A movable sliding member 12 is arranged along an axis of the guide shaft 11.

In the card feed mechanism 6, a pin 20 is fixedly mounted vertically and suitably in a belt 19 wound round pulleys 17 and 18. The pin 20 is so arranged as to be coupled to the sliding member 12. Further, a pulley 21 is fixed on a shift below the pulley 17. A drive motor 23 is coupled to the pulley 21 via transmission means 22 such as a belt.

A head feed mechanism 13 for the optical head 5 is mounted on a lead screw 24 and a guide shaft 25 arranged perpendicularly to the traveling direction of the holder 4. The lead screw 24 is mounted on the shaft of a clockwise and counterclockwise rotatable head feed motor 26. Accordingly, when the head feed motor 26 operates, the optical head 5 travels perpendicularly to the feeding direction of the optical card 8 by means of the guide shaft 25 and the lead screw 24, thus causing a recording information track of the optical card 8 to operate in access.

Operation of the optical information recording/reproducing device will be described. The holder 4 is positioned near to the card insertion opening 1 under a card insertion stand-by state. Under this state, when the optical card 8 is inserted and then detected by the detector 9, the card load/eject mechanism 10 operates. The card load/eject mechanism 10 automatically fetches the inserted optical card 8 into the card holding portion 7 of the holder 4.

The drive motor 23 in the card feed mechanism 6 sequentially operates and transfers the belt 19. Then the pin 20 mounted on the belt 19 drags to move the holder 4 along the guide shaft 3 by way of the sliding member 12.

When the connecting pin 20 reaches the outer periphery of the pulley 17, the connecting pin 20 causes the sliding member 12 to slide transversely with respect to the holder 4, thus semicircularly moving the pulley 17 toward the back side. The connecting pin 20, in turn, moves the holder 4 backwards via the sliding member 12 along the guide shaft 3, similarly to the time of the forward movement. Hence the holder 4 is reciprocated through a unidirectional continuous rotation of the drive motor 23. Under backward movement of the holder 4, an information recording track 28 of the optical card 8 moves relatively to the optical head 5, whereby the information is recorded and reproduced. When the holder 4 is returned to the original position, the head feed motor 26 cooperates in interlocking therewith and a track access operation is performed by the guide shaft 25 and the lead screw 24, whereby the card feeding operation is repeatedly performed in the similar manner.

Figure 2:
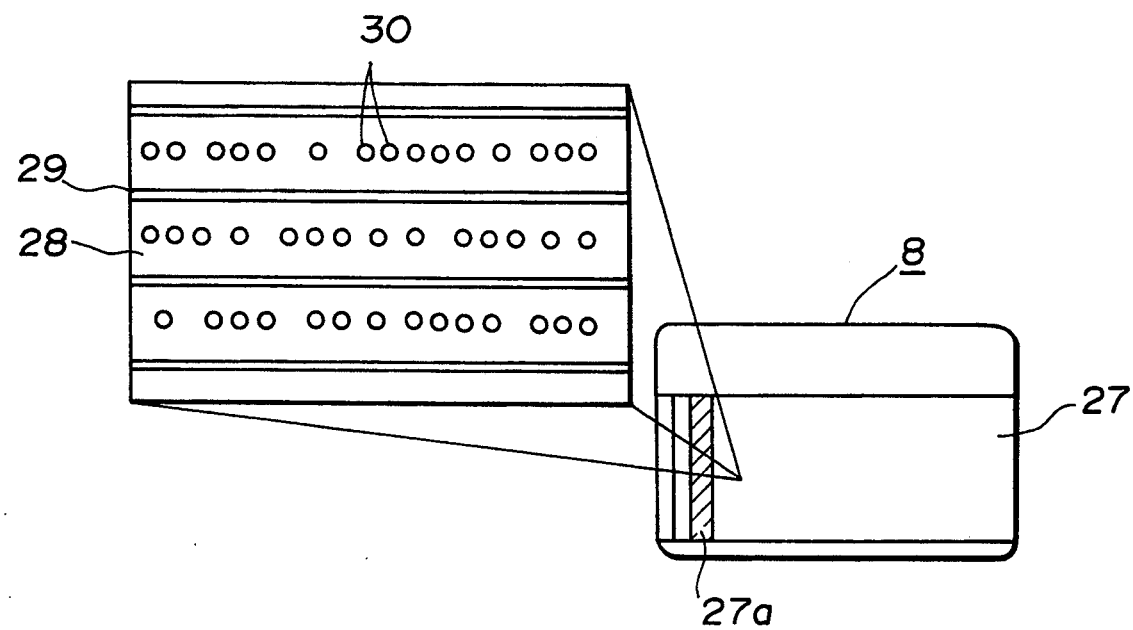

The optical card 8, as shown in FIG. 2, includes a strip of an optical information recording region 27 on one surface thereof. The number of information recording tracks 28 are formed on the information recording region 27 and are subjected to an information recording and reproducing by illuminating light onto the information recording track 28 by the optical head 5. In the figure, a track guide 29 is used by the optical head 5 for tracking the information recording track 28 and pits 30 constitutes the information unit formed on the information recording track 28. The pits 30 are formed by making a thermal irreversible change due to light radiation in the information recording region 27 to occur. In this embodiment, the pit 30 has a lower light reflectance than that of the periphery. Further, a track ID 27a recording previously recorded information such as information of a track number is formed at one end of the information recording region 27.

Figure 3:
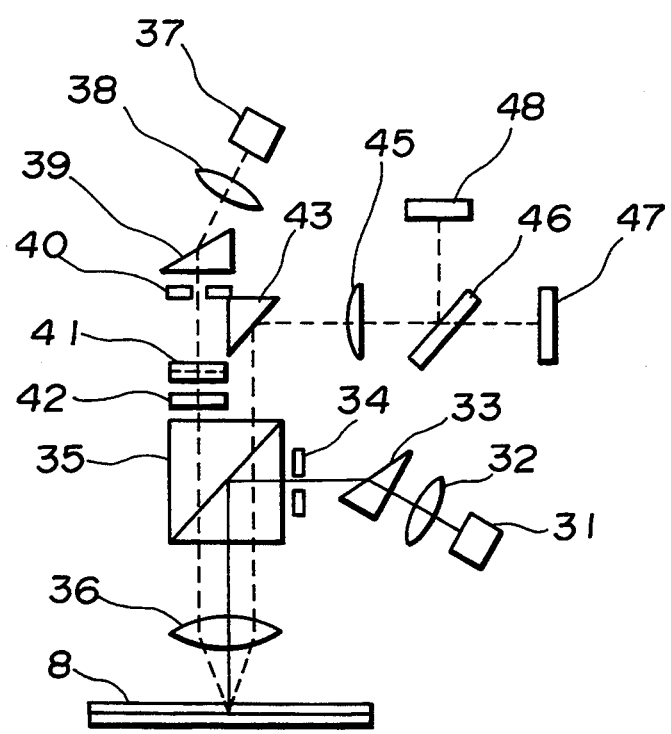

In the optical head 5, as shown in FIG. 3, the optical beam emitted by a semiconductor laser 31 as an information recording light source is converted to a nearly oval, parallel beam by a collimator lens 32. Then the parallel beam is stopped in parallel beam diameter and is shaped to have a substantially round form by reducing only the oval major axis component thereof by means of a shaping prism 33. The shaped beam is focused to a predetermined spot size on the optical card 8 by a round iris 34 to be irradiated as a recording round beam to a polarizing beam splitter 35.

The recording round beam is formed of substantially an S-polarizing component due to the nature of the semiconductor laser 31. For this reason, most of the recording round beam is reflected back on the reflective surface of the polarizing beam splitter 35 and is incident upon the optical axis of an objective lens 36. The light is condensed by the objective lens 36 to form a round spot on the optical card 8 so that the energy density is locally enhanced. Thus a recording pit is formed due to the thermal irreversible change in the recording layer of the optical card 8.

Meanwhile, differentiated from the semiconductor laser 31, another semiconductor laser 37 arranged as an information reproducing light source emits an optical beam which passes through a collimator lens 38 to make substantially an oval and parallel beam. The parallel beam is shaped to have a nearly round form by enlarging only the minor axis component of the oval by a shaping prism 39. The round beam is further stopped in parallel beam so as to have a predetermined spot size on the optical card 8 by means of a round iris 40 and is incident upon a plano-concave cylindrical lens 41.

The plano-concave cylindrical lens 41 refracts unidirectionally the optical beam in the vertical surface with respect to the optical axis to make a beam diverging slightly in the direction. Moreover, a diffraction grating 42 separates the optical beam into a 0-order diffractive light and two primary diffraction light. Then the cylindrical lens 41 and the diffraction grating 42 are arranged at such a position that the optical beam diverging direction by the cylindrical lens 41 extends substantially perpendicularly to the diffractive direction by the diffraction grating 42.

The three optical beams divided by the diffraction grating 42 are each formed substantially of a P-polarizing component due to the property of the semiconductor laser. Accordingly, most of the components pass through the polarizing beam splitter 35 and are condensed by the objective lens 36 to project three spots on the optical card 8. Since the optical beam is originally diverged by the cylindrical lens 41, each optical beam spot formed on the optical card 8 is also enlarged in the diverging direction and is formed.

Figure 4:
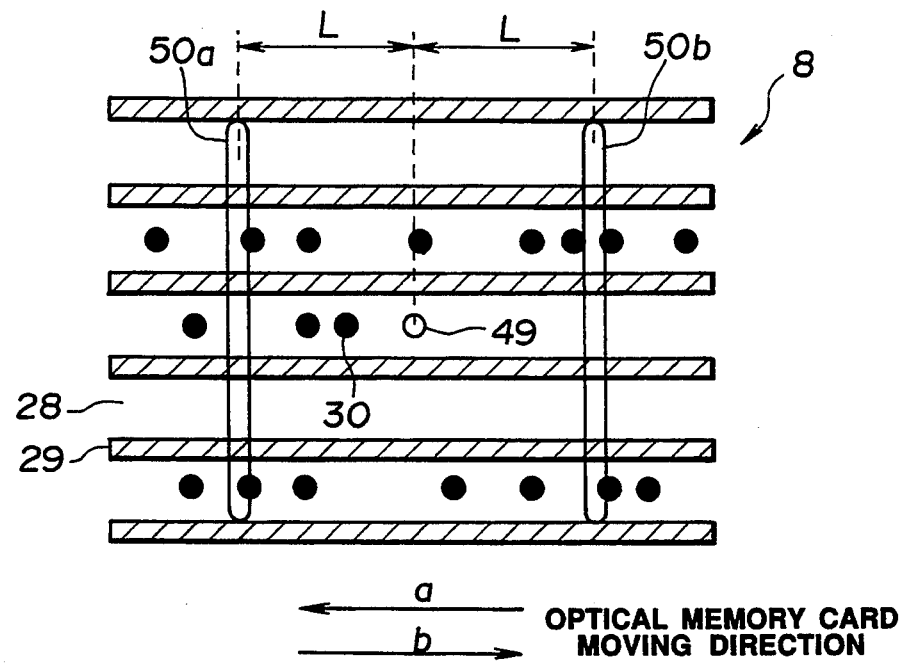

FIG. 4 is a view showing the positional relationship between a recording optical beam spot 49, a zero-order diffraction light spot 50a and a primary diffraction light spot 50b of the reproducing optical beam formed on the optical card 8. As shown in FIG. 4, positions of the diffraction light spots 50a and 50b of the reproducing optical beam are brought to spacing L in which spacing between the recording optical spot 49 and the reproducing spot 50a in the track direction and spacing between the recording optical spot 49 and the reproducing optical spot 50b are equal to each other.

The arrangement at the positions are adjusted by providing the relative angle difference between the optical axis of the recording optical beam and the optical axis of the reproducing optical beam prior to be incident upon the objective lens 36 upon assembling and adjustment of the optical head. The cylindrical lens 41 is arranged in such a manner that the directions in which the reproducing optical beam spots 50a and 50b on the optical card 8 are diverged, are substantially perpendicular to the extending direction of a track 28, whereby information of plural tracks 28 can be obtained simultaneously.

Returned to FIG. 3, the diffraction light spots 50a and 50b of the reproducing optical beam are subjected to a light amount modulation based on the presence of a track guide 29 and a pit 30 on the optical card 8 and then are irradiated to, for example, five tracks on the optical card 8 to be reflected regularly back from them. The reflected light passes reversely through the objective lens 36 and is introduced to the polarizing beam splitter 35 as a nearly parallel light. Being reflected regularly back on the optical card 8 maintains the reflection light being substantially a P-polarizing light. Most of the components pass through the polarizing beam splitter 35 and are introduced to a reflective mirror 43. The components are reflected by a reflective mirror 43, subsequently condensed by a condenser lens 45, split by a half mirror 46, and are incident respectively upon the light receiving surfaces of an optical detectors 47 for signal reproducing and tracking and the focusing optical detector 48, to project, in enlargement, the spot image.

As described above, the reproducing optical beam is incident upon the position eccentric from the optical axis with respect to the objective lens 36 to perform a so-called out-of axis focus detection. The focusing optical detector 48 includes, for example, a two-split light receiving element (not shown) which detects the movement of a reproducing optical beam spot image due to a focus deviation by the two-split light receiving element.

Figure 5:
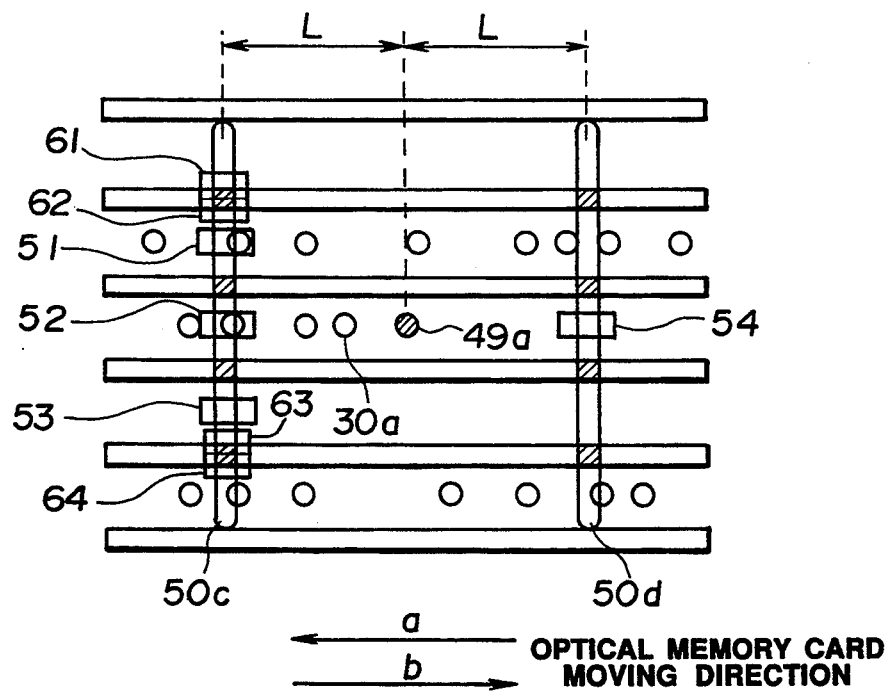

FIG. 5 is a view showing a spot image of a recording optical beam and spot images of 0-order diffraction light and the primary diffraction light of a reproducing optical beam projected on the optical detector 47. Signal reproducing light receiving elements 51, 52, and 53 and tracking light receiving elements 61, 62, 63, and 64 are arranged on the optical detector 47. In this connection, numeral 30a represents an image on the optical detector 47 of the pit 30.

The tracking light receiving elements 61, 62, 63, and 64 detect a positional change of track guide image due to a track deviation as a change in light receiving amount to produce a tracking error signal. The optical information recording/reproducing device performs a tracking control in response to the tracking error signal by using the tracking control circuit described later.

When an image 50c corresponding to a 0-order diffraction light spot 50a, which image is an enlarged and projected reproducing optical beam image, is imaged with no track deviation and focus deviation to a proper position on the signal reproducing light receiving elements 51, 52, and 53, the signal reproducing light receiving elements 51, 52, and 53 detect as a light amount change the presence of pits of three tracks using the 0-order diffraction light spot 50a to output a reproducing signal.

Further, a signal reproducing light receiving element 54 is arranged at the position where an image 50d corresponding to a primary diffraction light spot 50b is projected on the optical detector 47. When the image 50d corresponding to the primary diffraction light spot 50b being the enlarged and projected light image of the reproducing optical beam is imaged to a proper position on the signal reproducing light receiving element 54 under a condition that there is no track deviation and no focus deviation, the signal reproducing light receiving element 54 detects the presence of a pit as a light amount change by using the primary diffraction light spot 50b to output an reproducing signal.

The recording optical beam spot image 49a is imaged to the center position between the imaging position of the image 50c corresponding to the 0-order diffraction light spot 50a and the imaging position of the image 50d corresponding to the primary diffraction light spot 50b and is spaced away from them by spacing L'.

Figure 6:
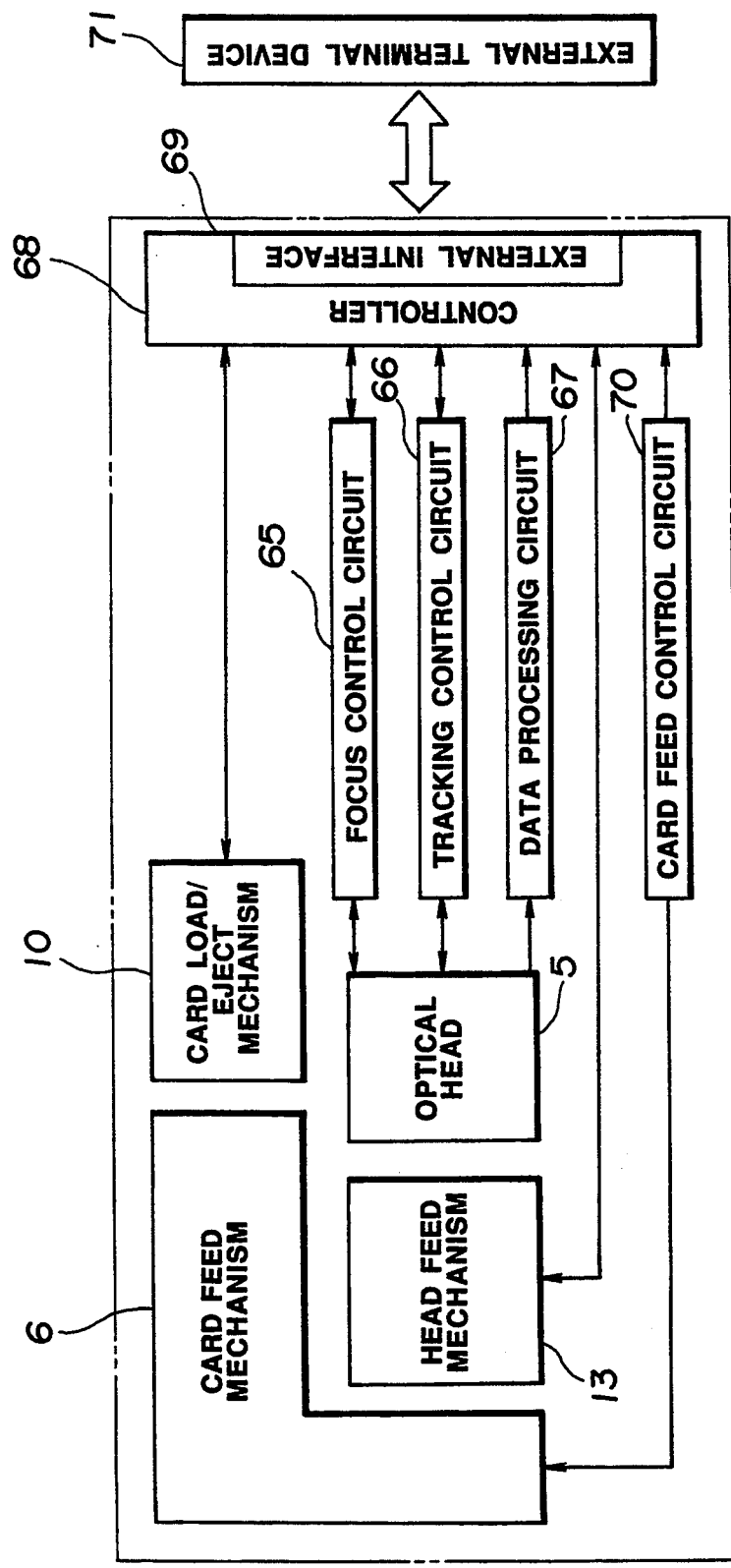

The optical information recording/reproducing device according to the present embodiment, as shown in FIG. 6, comprises, in addition to the card feed mechanism 6, the card load/eject mechanism 10, and the head feed mechanism 13, a focus control circuit 65, a tracking control circuit 66, a data processing circuit 67 and a card feed control circuit 70 connected to a controller 68 for controlling the whole system. The data processing circuit 67 modulates recording data to record data on the optical card 8 using the optical head 5 and to modulate the recorded data.

The optical head 5 detects a track guide mounted on the recording surface of the optical card 8 and produces a servo signal such as a tracking error signal, a focus signal. In response to the servo signal, the focus control circuit 65 executes an automatic focus control and the tracking control circuit 66 executes an automatic tracking control.

Moreover, the controller 68 is electrically connected to the card feed mechanism 6 through the card load/eject mechanism 10, the head feed mechanism 13, and the card feed control circuit 70, and comprehensively controls operations of each mechanism upon recording or reproducing. In this connection, the controller 68 is connected to an external terminal device 71 via an external interface 69.

Figure 7:
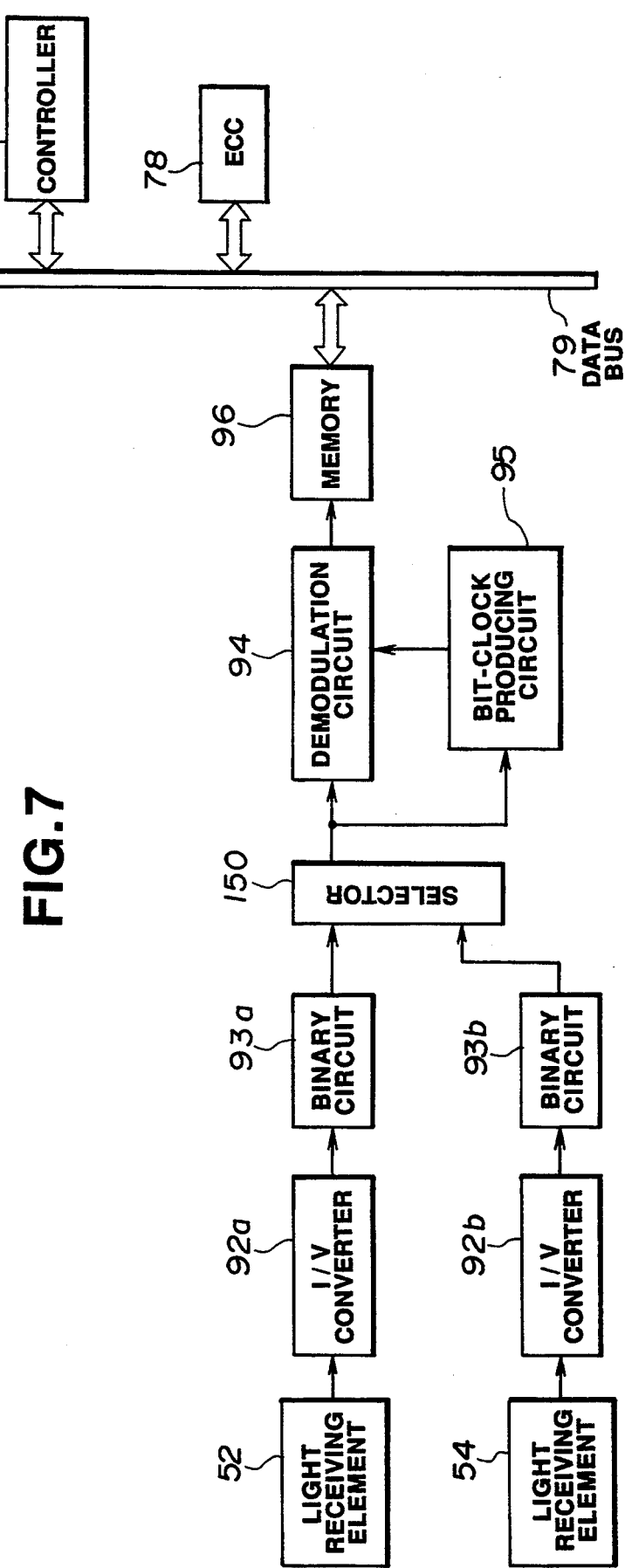

As shown in FIG. 7, the data processing circuit 67 includes I/V converters 92a and 92b for converting the signals received by the signal reproducing receiving elements 52 and 54 into current and voltage, respectively, and binary circuits 93a and 93b for converting the outputs from the I/V converters 92a and 92b into binary signals at a reference level, respectively.

Furthermore, the data processing circuit 67 includes a selector 150 for selecting the outputs of the binary circuits 93a and 93b. When the optical card 8, for example, moves forwards, the selector 150 selects the binary circuit 93a. When the optical card 8 moves backwards, the selector 150 selects the binary circuit 93b.

Furthermore, the data processing circuit 67 includes a bit-clock producing circuit 95 for producing bit-clocks based on the binary signal outputted from the selector 150. A demodulation circuit 94 samples binary signals outputted from the selector 150 in accordance with the bit clock to demodulate data from the result.

Further, the data processing circuit 67 includes a memory 96 for storing the demodulated result outputted from the demodulation circuit 94. Data stored in the memory 96 are data prior to error correction.

An error correction circuit 78 executes an error correction on data prior to an error correction on each track stored in the memory 96.

The controller 68 controls the error correction circuit 78, the memory 96 and the like via a data bus 79. Normally, a CPU is used as the controller 68.

In connection with the above, although not shown, the reproducing signals from the signal reproducing light receiving elements 51 and 53 are also reproduced in a similar circuit configuration.

An explanation will be made below to operation of the optical information recording/reproducing device arranged as described above.

In the information recording, when the optical card 8, as shown in FIG. 4, is moving in the direction indicated by the arrow a (in the forward direction), the pit 30 formed by the recording optical beam spot 49 moves in the direction of the 0-order diffraction light spot 50a of a reproducing optical beam. As shown In FIG. 5, when the image 30a of the pit 30 on the optical detector 47 has reached the position of the image 59c of the spot 50a, a change in light amount occurs in the signal reproducing light receiving element 52. The light amount change produces a reproducing signal (verify signal) immediately after recording to start a verify operation on the basis of the reproducing signal.

Furthermore, in a case where the moving direction of the optical card 8 is reversed so that the optical card 8 moves in a direction indicated by the arrow b (a reverse direction), the pit 30 formed by the recording optical beam spot 49 moves in a direction of the spot 50b due to the primary diffracted light of the reproducing optical beam spot 49. When the image 30a of the pit 30 reaches the position of the image 50d of the spot 50b on the optical detector 47, a change in light amount occurs in the signal reproducing light receiving element 54. It is possible to obtain a reproducing signal (a verify signal) immediately after recording from the change in light amount. The verify operation is performed on the basis of the reproducing signal.

Figure 8:
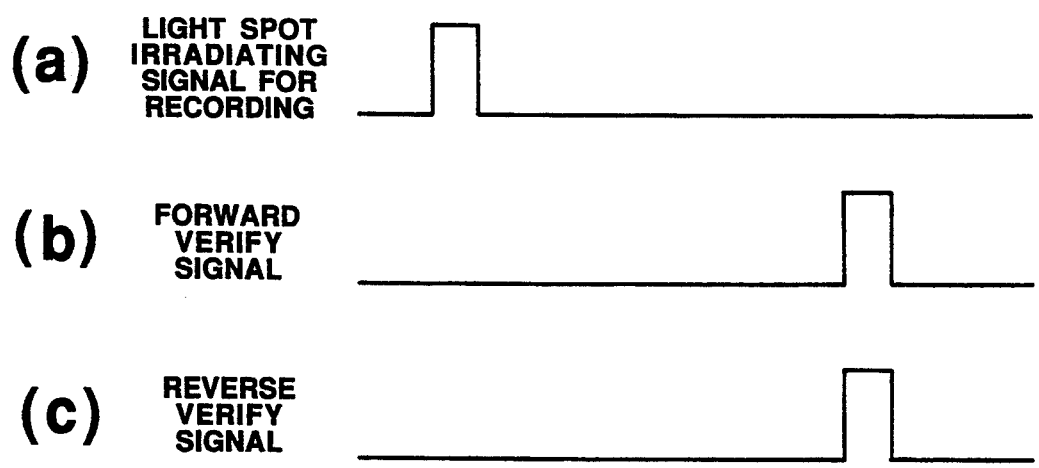

FIG. 8 is a view explaining the time delay which takes to the verify signal available time of the pit formed by irradiation of a recording optical spot from a recording optical spot irradiation time when the optical recording medium moves forwards and backwards at the same speed with respect to the optical head.

As shown in FIG. 8, light is irradiated such that the space between the recording optical spot and the 0-order diffraction light spot 50a for reproducing light is equal to the space between the recording optical spot and the primary diffraction light spot 50b for reproducing light. Hence, in the optical detector 49, even if the optical card 8 moves forwards or backwards, there is no difference in the time delay taken to the pit verify signal available time from the pit recording time.

In other words, even if the optical card 8 moves forwards or backwards, the same timing for an verify start operation enables to share the measuring time of verify-start timing setting means (for example, in which a timer circuit such as a counter or the like (not shown) in the controller 68), in which it is not necessary to switch the verify start setting time in accordance with the moving direction of the optical card 8.

Hence a verify signal can be accurately detected by merely switching the selector 150 in accordance with the movement of the optical card 8.

Figure 9:
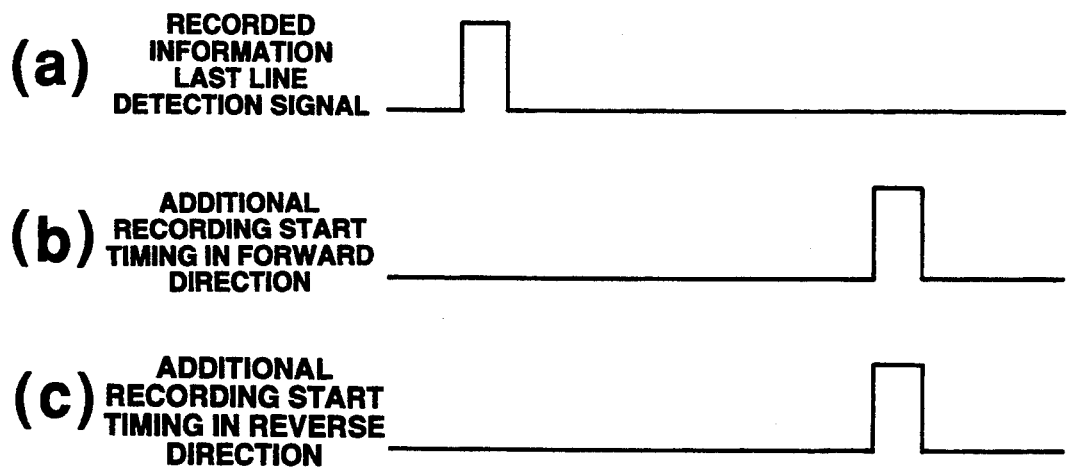
FIG. 9 is an explanatory view describing time delay from detection of the rear of the last recorded pit line to start of postscript when the optical card moves relatively with respect to the optical head, in forward and reverse directions.
Figure 10:
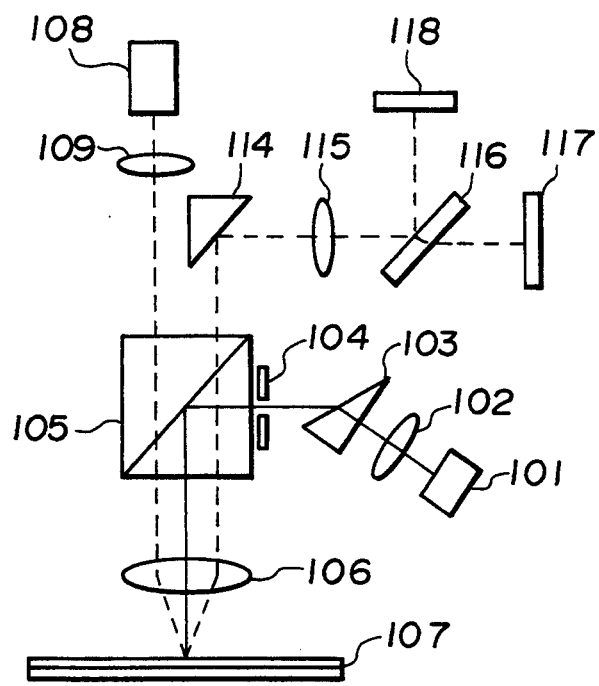
FIGS. 10 to 12 relate to a prior art example, FIG. 10 being an arrangement view showing an arrangement of an optical system of an optical head.
Figure 11:
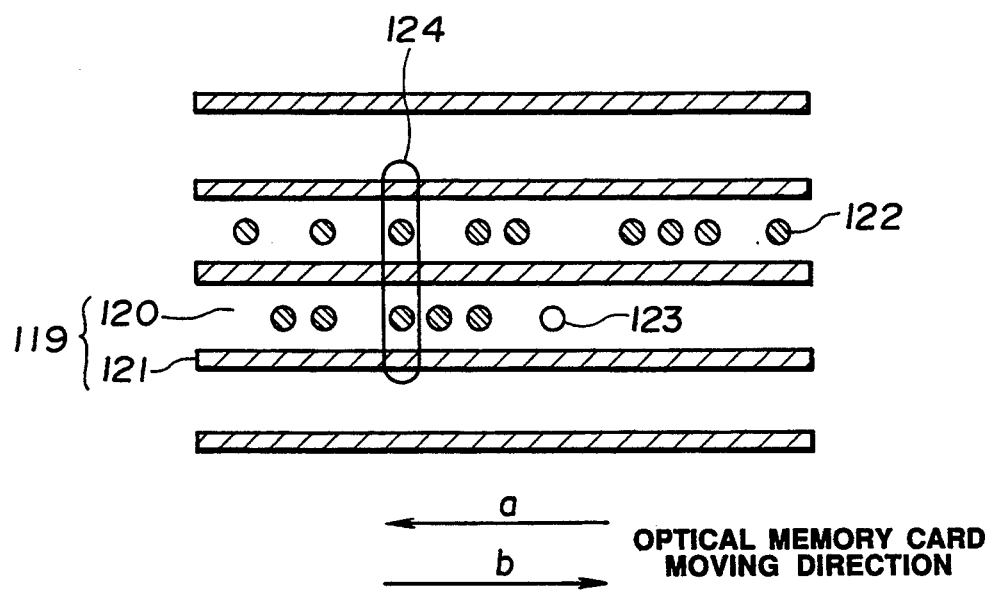
Figure 12:
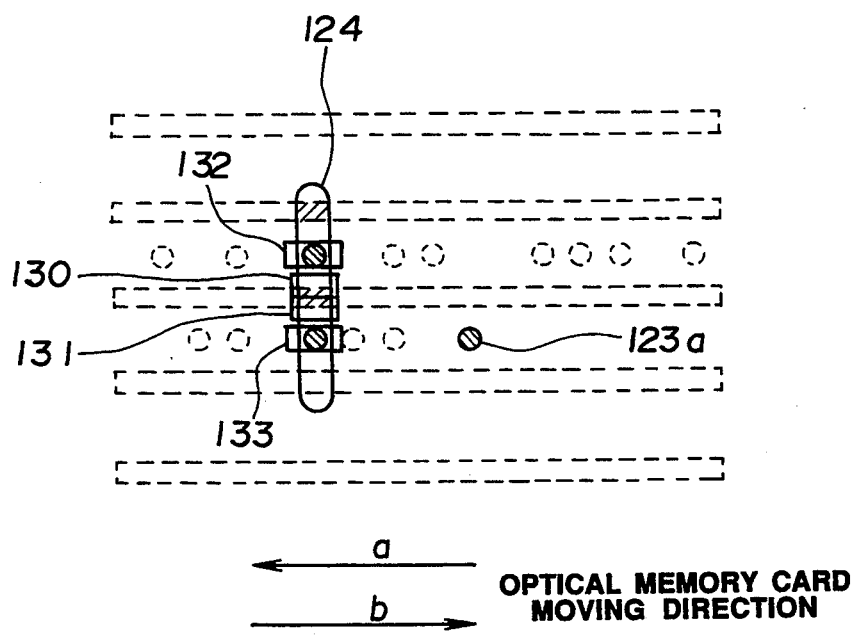

When the optical card moves relatively with respect to the optical head in forward and reverse directions, as will be clear from FIG. 9 which shows time delay from detection of the last recorded pit time to start of postscript, when the optical card 8 moves in the forward direction, the optical reproducing light receiving element 54 on the optical detector 47 reads the track TD and the recorded selector of a recording track before information is recorded by the recording optical spot 49. An additional recording operation of the following sector can be started after a lapse of a predetermined period of time based on the record format after the detection of the last information.

Similarly, when the optical card 8 moves in the reverse direction, the reproducing light receiving element 52 can start an additional recording operation before information is recorded by using the recording optical spot 49.

In this manner, in the optical information recording-/reproducing device according to the present embodiment, there is provided the following advantage. That is, the reproducing optical spots are irradiated respectively in the front of and in the rear of the recording optical spot 49. The reproducing optical spot is irradiated to a position where the space between the recording optical spot 49 and the O-order diffraction light spot 50a of the reproducing light is the same as the space between the recording optical spot and the primary diffraction light spot 50b of the reproducing light. For this reason, the optical information recording/reproducing device having the simplified structure can detect accurately a verify signal immediately after recording even if the optical card 8 moves forwards or backwards.

Furthermore, there is provided the following advantage. That is, even if the optical card 8 moves forwards or backwards, since the time delay taken from the detection of the rear of the track ID and recorded sector to the additional sector recording start can be made at the same value, the controller 68 can effectively set the timing for an additional record to the same value without depending on the moving direction of the card. Further, an additional record timing signal producing circuit can be produced integrally with a single circuit without depending on the movement of the card.

In connection with the above, the number of tracks on which the reproducing optical spots in front and in rear of the recording optical spot is irradiated simultaneously, the number of reproducing light receiving elements, and the layout of the light receiving element should not be limited to the above embodiments.

In other words, when at least the reproducing optical spots are irradiated on the tracks the same as the tracks on which the recording optical spots are irradiated in front and in rear of the recording optical spot (the irradiation position of the reproducing optical spots in front thereof and in rear thereof are determined in such a manner that the space between the recording optical spot and one reproducing light spot equals the space between the recording optical spot and the other spot), the light receiving element may be arranged at the position where a pit on an optical memory card is detected by using a reproducing optical spot in front thereof and in rear thereof.

Further, in the above embodiments, when the reproducing optical beam spot 50b irradiates simultaneously a plurality of tracks, a plurality of information reproducing light receiving elements may be arranged at the position where the irradiating region and the track are imaged, together with the reproducing light receiving element 54. Circuits for processing signals from a plurality of added light receiving elements may additionally be arranged in the data processing circuit.

Furthermore, the configuration of the data processing circuit should also not be limited to those in the embodiments. For example, if the selector is connected to the output of the I/V converter, the rear-stage circuits may be used in common. The position of the selector should not be limited to that in the embodiments. In the embodiments, the selector may be arranged at any position if the outputs of the reproducing light receiving elements 52 and 54 can be selected. Further, the controller 68 may be constituted so as to be able to access selectively the memory by arranging a demodulation circuit for demodulating binary data of the reproducing light receiving elements 52 and 54 and a memory for storing the same and the like, without using the selector. Further, in the embodiments, the reproducing optical beam from a single light source is separated into the O-order diffraction light and the primary diffraction light by means of a diffraction grating to form two reproducing light irradiating regions. However, another light source may be used and optical detectors may be discretely formed.

Moreover, in the track scanning of the optical card 8, the optical head 5 is moved in the track direction and the optical card 8 is moved perpendicularly to the track direction. However, without limiting to the embodiment, another method, for example, only an optical head may be two-dimensionally moved to scan the track.

According to the present invention, it is clear that different modes can be constituted in widely different way based on the present invention without departing from the spirit and scope of the invention. The present invention should not be limited to the specific embodiments.

Instead it should only be limited by the appended claims.

What is claimed is:

1. An optical information recording/reproducing device comprising:
   an optical head including:
      a recording light source means for irradiating a recording optical beam onto at least one of a plurality of tracks of an optical recording medium, said optical recording medium having a plurality of information recordable tracks,
      at least one reproducing light source means: (a) for irradiating a first reproducing optical beam onto a position in front of a track, in a track direction, irradiated by said recording light source means, and (b) for irradiating a second reproducing optical beam onto a position in the rear of said track, in the track direction, irradiated by said recording light source means with respect to said track illuminated at least by said recording light source means, first light-receiving detecting means for receiving a returned light of said first reproducing optical beam from said optical recording medium and for outputting information of said track as a detection signal, and second light-receiving detecting means for receiving a returned light of said second reproducing optical beam from said optical recording medium and for outputting information of said track as another detection signal;

scanning means for moving relatively with respect to said optical recording medium and said optical head to scan said track; and signal processing means for signal-processing said detection signal and said another detection signal, wherein said reproducing light source means irradiates said first reproducing optical beam and said second reproducing optical beam to a position in which a space in a track direction between an irradiating position of said recording optical beam and an irradiating position of said first reproducing optical beam is equal to another space in a track direction between an irradiating position of said recording optical beam and an irradiating position of said second reproducing optical beam.

2. An optical information recording/reproducing device according to claim 1, wherein said scanning means comprises optical head drive means for driving said optical head in a direction perpendicular to said track direction; and:

optical recording medium drive means for driving said optical recording medium in said track direction.

3. An optical information recording/reproducing device according to claim 1, wherein said reproducing light source means irradiates said first reproducing optical beam and said second reproducing optical beam from a single optical beam separated by means of a diffraction grating.

4. An optical information recording/reproducing device according to claim 1, further comprising selecting means for selecting said detection signal produced by said first light-receiving detecting means and said another detection signal produced by said second light-receiving detecting means.

5. An optical information recording/reproducing device according to claim 4, wherein said selecting means for selects said detection signal and said another detection signal, based on the scanning direction of said scanning means.

6. An optical information recording/reproducing device according to claim 2, further comprising selecting means for selecting said detection signal produced by said first light-receiving detecting means and said another detection signal produced by said second light-receiving detecting means.

7. An optical information recording/reproducing device according to claim 6, wherein said selecting means selects said detection signal and said another detection signal, based on the drive direction of said optical recording medium driving means.

8. An optical information recording/reproducing device according to claim 1, wherein said optical recording medium comprises an optical card.

9. An optical head comprising:

a recording light source means for irradiating a recording optical beam onto at least one of a plurality of tracks of an optical recording medium, said optical recording medium having a plurality of information recordable tracks;

a reproducing light source means for irradiating a first reproducing optical beam onto a position in front of a track position irradiated by said recording light source means and a second reproducing optical beam onto a position in rear of said track irradiated by said recording light source means with respect at least to said track irradiated by said recording light source means;

first light-receiving detecting means for receiving a returned light of said first reproducing optical beam from said optical recording medium and for outputting information of said track as a detection signal; and second light-receiving detecting means for receiving a returned light of said second reproducing beam from said optical recording medium and for outputting information of said track as another detection signal, wherein said reproducing light source means irradiates said first reproducing optical beam and said second reproducing optical beam to a position where a space in a track direction between an irradiating position of said recording optical beam and an irradiating position of said first reproducing optical beam is equal to another space in a track direction between an irradiating position of said recording optical beam and an irradiating position of said second reproducing optical beam.

10. An optical head according to claim 9, wherein said reproducing light source means irradiates said first reproducing optical beam and said second reproducing optical beam, said beam being formed as a result of a single optical beam being separated by a diffraction grating.

11. An optical head according to claim 9, wherein said optical recording medium comprises an optical card.

* * * * *